J. H. BOYE.
KNIFE.
APPLICATION FILED JAN. 29, 1914.

1,114,221.

Patented Oct. 20, 1914.

Witnesses:

Inventor:
James H. Boye,
By Dyrenforth, Lee, Chritton and Wiles,
Attys.

UNITED STATES PATENT OFFICE.

JAMES H. BOYE, OF CHICAGO, ILLINOIS, ASSIGNOR TO THE BOYE NEEDLE COMPANY, OF CHICAGO, ILLINOIS.

KNIFE.

1,114,221.   Specification of Letters Patent.   Patented Oct. 20, 1914.

Application filed January 29, 1914. Serial No. 815,192.

*To all whom it may concern:*

Be it known that I, JAMES H. BOYE, a citizen of the United States, residing at Chicago, in the county of Cook and State of Illinois, have invented a new and useful Improvement in Knives, of which the following is a specification.

This invention pertains particularly to pocket-knives, the primary object being to provide a knife having automatically-opening blades provided with improved catch-devices for securing the blades in closed position.

The invention is illustrated in the accompanying drawing, in which—

Figure 1:
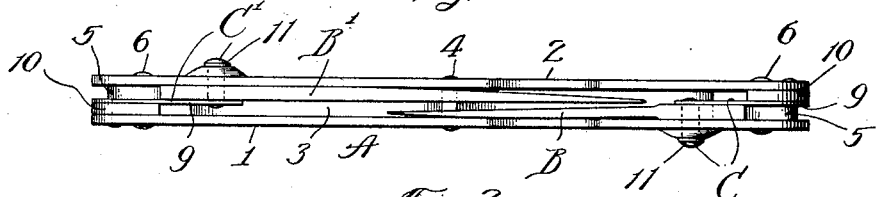
Figure 2:
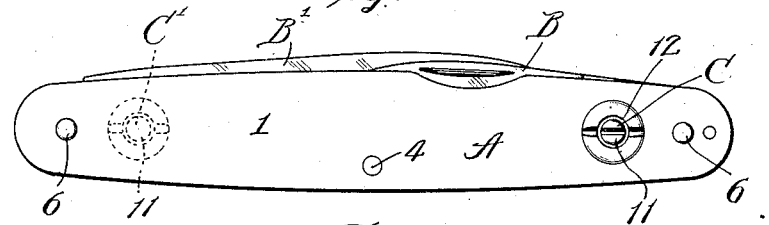
Figure 3:
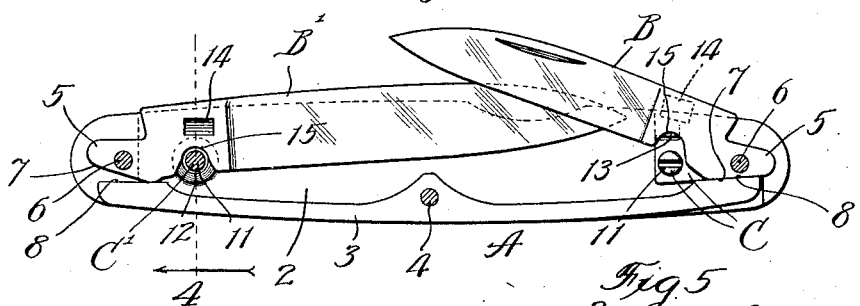
Figure 4:
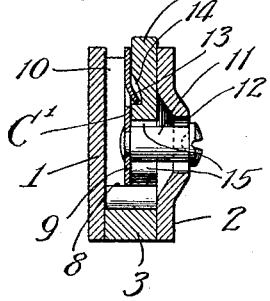
Figure 5:
Figure 6:
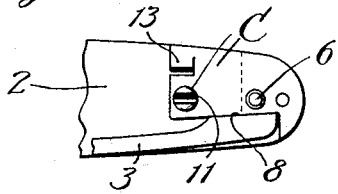

Figure 1 represents a plan view of the improved knife; Fig. 2, a side view of same; Fig. 3, a sectional view, showing one side of the handle removed; Fig. 4, an enlarged section taken as indicated at line 4 of Fig. 3; Fig. 5, a broken plan view, showing a detail of the improved catch device; and Fig. 6, a broken, elevational view showing the same feature.

In the form illustrated, the knife comprises a handle A; blades B, B'; and catch-devices C, C'. The handle comprises the sides 1 and 2, and a back 3 consisting of a spring having free ends, the spring being secured between the sides by a rivet 4, in the usual manner. Each blade has its shank-portion 5 connected with the end-portion of the handle-sides by a pivot 6, and the shank of each blade has an inclined or beveled shoulder 7 adapted to contact with a flat surface 8 with which the end-portions of the spring are provided. The arrangement is such that the blades will be thrown to the partially-open position when the catches C, C' are released. Each of the catches C, C' comprises a short leaf-spring 9 secured on the pivot 6 adjacent a spacing-lug 10, and a push-button, or lateral stem 11 projecting from the free end of the spring through an embossed perforation 12 with which the handle-side 1 or 2, as the case may be is provided.

The spring 9 has its outer end confined between the spacing-piece 10 and one side of the blade. The spring is confined within the handle of the knife, the free end being disposed some distance from the pivot 6. The stud 11 is carried by the lower portion of the free end of the spring. Above the stud, the metal of the spring is slit, and a portion is bent laterally to afford an inclined stop or catch 13, which is adapted to engage a lateral socket 14 with which the shank of the blade is provided inside of the pivot. The lower or inner edge portion of the shank of the blade is recessed, as indicated at 15, to accommodate the shank of the push-button 11. The spring 9 is bent slightly and adapted to press normally against the side of the blade, when the blade is closed, so that the catch 13 will engage the socket or notch 14 in the manner shown in Fig. 4.

Where two blades connected with opposite ends of the handle are employed, as illustrated, it is preferred to arrange the catch-devices on opposite sides of the blades, so that the springs 9 are both centrally disposed, as shown. The shank of the push-button, in each case, extends beneath the shank of the blade. To open the blade, it is only necessary to press the appropriate push-button inwardly to release the catch 13 from engagement with the notch 14, whereupon the main-spring of the knife will throw the blade to the partially-open position, after which the blade may be opened in the usual manner. In the operation of closing the blade, the shank-portion of the blade presses the catch 13 out of the way until the notch 14 registers with the catch, whereupon the catch springs into interlocking engagement with the notch.

The foregoing detailed description has been given for clearness of understanding only, and no unnecessary limitation should be understood therefrom.

What I regard as new and desire to secure by Letters Patents is—

A knife comprising a handle having two parts spaced the width of two blades, a spring back therefor, a pivot at each end connecting said parts, a blade mounted on each pivot adjacent one part of said handle and spaced apart from the other, a shank on each blade so formed that said spring back will tend to open the blades, each shank having a lateral locking notch adjacent the open space between the parts of said handle, a leaf spring mounted on each pivot having a coacting projection adapted to engage the notch in the adjacent blade, and a stud connected with each leaf spring independent of and at one side of each pivot, each stud projecting through one of the parts of said handle and adapted to be pressed to move said leaf spring toward the open space between the parts of said handle to release the blades.

JAMES H. BOYE.

In presence of—
D. C. THORSEN,
O. C. AVISUS.

Copies of this patent may be obtained for five cents each, by addressing the "Commissioner of Patents, Washington, D. C."